United States Patent
Tanaka et al.

(10) Patent No.: US 7,987,050 B2
(45) Date of Patent: Jul. 26, 2011

(54) MATERIAL HANDLING VEHICLE LOCATION SYSTEM

(75) Inventors: Masayuki Tanaka, Sagamihara (JP); Akiko Shinozaki, Sagamihara (JP); Jun Ota, Tokyo (JP); Tsai-Lin Chou, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 779 days.

(21) Appl. No.: 11/956,543

(22) Filed: Dec. 14, 2007

(65) Prior Publication Data

US 2009/0082968 A1 Mar. 26, 2009

(30) Foreign Application Priority Data

Sep. 26, 2007 (JP) .................................. 2007-249023
Nov. 21, 2007 (JP) .................................. 2007-301413

(51) Int. Cl.
*G06F 17/10* (2006.01)
(52) U.S. Cl. ....................................................... 701/300
(58) Field of Classification Search .................... 701/19, 701/300
See application file for complete search history.

(56) References Cited

U.S. PATENT DOCUMENTS 5,812,267 A * 9/1998 Everett et al. ................. 356/614
2008/0147274 A1 * 6/2008 Ko ................................... 701/41

* cited by examiner

*Primary Examiner* — Kim T Nguyen
(74) *Attorney, Agent, or Firm* — Birch, Stewart, Kolasch & Birch, LLP

(57) ABSTRACT

A system for detecting actual position of a material handling vehicle in a warehouse in which a plurality of racks composed of upright frame members and lateral frame members connecting the upright members are installed so that material handling vehicles can travel along the passageway between the racks so that current position of the material handling vehicle in the warehouse can be detected with increased reliability even if some of the reflections fail to be received by the sensors. Reflector plates are attached to each of the upright frame members and the lateral frame members along longitudinal direction thereof, sensors are attached to the vehicle, and a controller is installed on the vehicle to estimate current location of the vehicle based on combination of the number of reflections actually received by the reflector plates and counted by the controller.

3 Claims, 4 Drawing Sheets

MATERIAL HANDLING VEHICLE LOCATION SYSTEM

BACKGROUND OF THE INVENTION

1. Field of the Invention

The present invention relates to a system for detecting the location where a material handling vehicle currently is in a warehouse in which a plurality of racks composed of upright frame members and lateral frame members connecting the upright members are installed so that material handling vehicles such as forklift trucks can travel between the racks.

2. Description of the Related Art

There has been known systems for detecting the actual location of a material handling vehicle operating material handling in a warehouse, in which the actual position of the vehicle is determined from image data of a photograph taken by a camera attached on the vehicle through pattern matching process or from a light beam or radio waves reflected from reflector plates located at predetermined positions by emitting a light beam or radio waves from a rotating projector attached on the vehicle.

In Japanese Patent No. 3443829 (patent literature 1) is disclosed a location detecting system, in which a laser navigator 8 is provided at an arm top part 7 of a forklift truck 2, and reflector plates 16 are adhered to shelves 14 at a height position about the same as that of the laser navigator 8. The location of each of the reflector plates is memorized in an on-vehicle controller 10. The laser navigator 8 emits a laser beam to allow it to scan 360° in a horizontal plane, receives reflection from the reflector plates 16. The reflection is checked with the map and actual location of the forklift truck is determined.

The height of a fork 4 is detected by an encoder connected to a guide roller 6 and the number of the shelf where material is handled is determined in combination with the detected location of the forklift truck 2 and the height position of the fork 4. Number of shelf where to handle material is directed by the controller 10. Every time material is handled according to the directive, the number of the shelf where material is handled is compared with the shelf number directed by the controller 10 to verify that material handling is performed as directed by the controller 10.

With this location detecting system, a means for allowing a laser beam to scan 360° in a horizontal plane is needed to detecting actual location of a material handling vehicle, and system structure is not so simple.

Further, it correct reading of the reflector plates fails, the controller misjudges the position of the material handling vehicle, and whether the position of the vehicle is detected correctly or not can not be checked, that is, degree of correctness of the detection of the position can not be grasped in point of view of probability theory. Therefore, with the system, management functions of material handling are still not sufficiently improved.

SUMMARY OF THE INVENTION

The present invention was made in light of problems of the prior art, and the object of the invention is to provide a system for detecting actual position of a material handling vehicle in a warehouse in which a plurality of racks composed of upright frame members and lateral frame members connecting the upright members are installed so that material handling vehicles can travel along the passageway between the racks together with correctness probability of the detected position, so that current position of the material handling vehicle in the warehouse can be detected with increased reliability even if some of the reflections fail to be received by the sensors.

To attain the object, the present invention proposed a material handling vehicle location system in a warehouse in which a plurality of racks composed of upright frame members and lateral frame members connecting the upright members are installed so that a material handling vehicle can travel along a passageway between the racks; wherein a first reflector plate is attached to each of the upright frame members at a height position between adjacent lateral frame members or between the floor and a lowest lateral frame member so that they face the passageway, and a plurality of second reflector plates are attached to the lateral frame members along longitudinal direction thereof so that they face the passageway; wherein a first sensor which emits a light beam and receives its reflection from each of the first reflector plates and a second sensor which emits a light beam and receives its reflection from each of the second reflector plates are attached to the vehicle; and wherein a controller which determine current location of the vehicle based on combination of the number of reflections actually received by the first sensor and counted by the controller and the number of reflections actually received by the second sensor and counted by the controller is installed on the vehicle.

(1) Said first and second reflector plates are located at equal spacing respectively, and said controller determine current location of the material handling vehicle from a ratio of the number of reflections actually received by the first sensor and counted by the controller to total number of the first reflector plates and a ratio of the number of reflections actually received by the second sensor and counted by the controller to total number of the second reflector plates.

(2) Said controller calculates a probability that the material handling vehicle is present in front of a reflector plate corresponding to the counted number of reflections actually received by the first and second sensors.

The invention proposes a material handling vehicle location system in a warehouse in which a plurality of racks composed of upright frame members and lateral frame members connecting the upright members are installed so that two material handling vehicles can travel in the same or counter direction passing each other along a passageway between the racks; wherein a first reflector plate is attached to each of the upright frame members at a height position between adjacent lateral frame members or between the floor and a lowest lateral frame member so that they face the passageway, and a plurality of second reflector plates are attached to the lateral frame member along long longitudinal direction thereof so that they face the passageway; wherein a first sensor which emits a light beam and receives its reflection from each of the first reflector plates and a second sensor which emits a light beam and receives its reflection from each of the second reflector plates are attached to the vehicle; and wherein a controller is installed on the vehicle, which controller recognizes another vehicle passing the concerned vehicle and allows exchange of position data of each of the vehicles by wireless radio communication.

It is preferable that the vehicle has a third sensor and reflector attached to each side of the body thereof at the same height position respectively, whereby the controller recognizes that the concerned vehicle is passing another vehicle when the third sensor of the concerned vehicle has received reflection from the reflector of the another vehicle.

It is also preferable that a set of first sensor and reflector and a set of second sensor and reflector are attached to both sides of the material handling vehicle respectively, whereby when the first sensor and second sensor of one of the vehicle receive reflections from the reflectors of the other vehicle simultaneously, the controller of each vehicle recognizes that the two vehicles have passed each other.

According to the invention, each of the first reflector plates is attached to each of the upright frame members of the rack at a height position between adjacent lateral frame members or between the floor and a lowest lateral frame member so that they face the passageway and a plurality of second reflector plates are attached to the lateral frame members along longitudinal direction thereof so that they face the passageway.

A first sensor which emits a light beam and receives its reflection from each of the first reflector plates and a second sensor which emits a light beam and receives its reflection from each of the second reflector plates are attached to the vehicle.

A controller is installed on the vehicle to determine current location of the vehicle based on combination of the number of reflections actually received by the first sensor and counted by the controller and the number of reflections actually received by the second sensor and counted by the controller.

The first reflector plates and second reflector plates are arranged at equal spacing respectively. The controller determines the current position of the material handling vehicle based on the ratio of the number of reflections received by the first sensor and counted by the controller to the total number of the second reflector plates and the ratio of the number of reflections received by the second sensor and counted by the controller to the total number of the second reflector plates.

Further, the controller calculates a probability that the material handling vehicle is present in front of a reflector plate corresponding to the counted number of reflections actually received by the first and second sensors.

Therefore, the reflector plates are required only to reflect light to show that the reflector plate is present, and the sensors are required only to emit and receive reflections from the reflector plates, so reflector plates and sensors of simple composition can be used, and the system can be constituted in low cost. As common reflector plates are used, changing of layout of racks in the warehouse can be easily done without changing reflector plates.

Also, the controller is required only to analyze the number of reflections, so a controller of simple composition can be used. Therefore, a reliable vehicle-location system of compact composition can be obtained.

As probability of correctness of the determination of the current position of the vehicle is calculated by the controller, actual position of the material handling vehicle in the warehouse can be determined with correctness probability even if some of the reflections fail to be received by the sensors provided on the vehicle.

Thus, actual position of forklifts can be detected with increased reliability, and it becomes possible to increase accuracy in management of material handling in the warehouse, that is, taking out and putting in material from and to specified places in the rack can be performed with increased reliability.

Particularly, as the first reflector plates are adhered to each of the upright frame members at a height position between adjacent lateral frame members or between the floor and a lowest lateral frame member, they do not interfere in a horizontal plane with the second reflector plates, the reflection from the first reflector plate and that from the second reflector plate do not interfere with each other, so both reflections can be received separately by the first and second sensors and position of the vehicle can be grasped on one hand by the reflections from the first reflector plates and on the other hand by the reflections from the second reflector plates. Therefore, the system is robust against detection error of reflections.

Thus, according to the invention, data for pattern matching and reflector plates for specifying their positions are not needed, and the system can meat change of layout of racks as necessary and adopted for existing facilities in a warehouse easily.

Further, in a warehouse in which two material handling vehicles can travel in the same or counter direction passing each other along a passageway between the racks, by providing to the vehicle a controller which recognizes another vehicle passing the concerned vehicle, transmits position data of the concerned vehicle to said another vehicle, and receives position data of said another vehicle by radio transmission, the position data of the vehicle can be corrected using the position data of the another vehicle passing the concerned vehicle. Therefore, accurateness of detection of the material handling vehicle in the warehouse can be increased.

Passing each other of two vehicles can be recognized by providing to each side of the vehicle a set of third sensor and reflector at the same height position respectively.

Passing each other of two vehicles can also be recognized by attaching a set of first sensor and reflector and a set of second sensor and reflector to both sides of the material handling vehicle respectively. In this case, the controller of each vehicle recognizes that the two vehicles have passed each other when the first sensor and second sensor of each of the vehicles receive reflections simultaneously.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
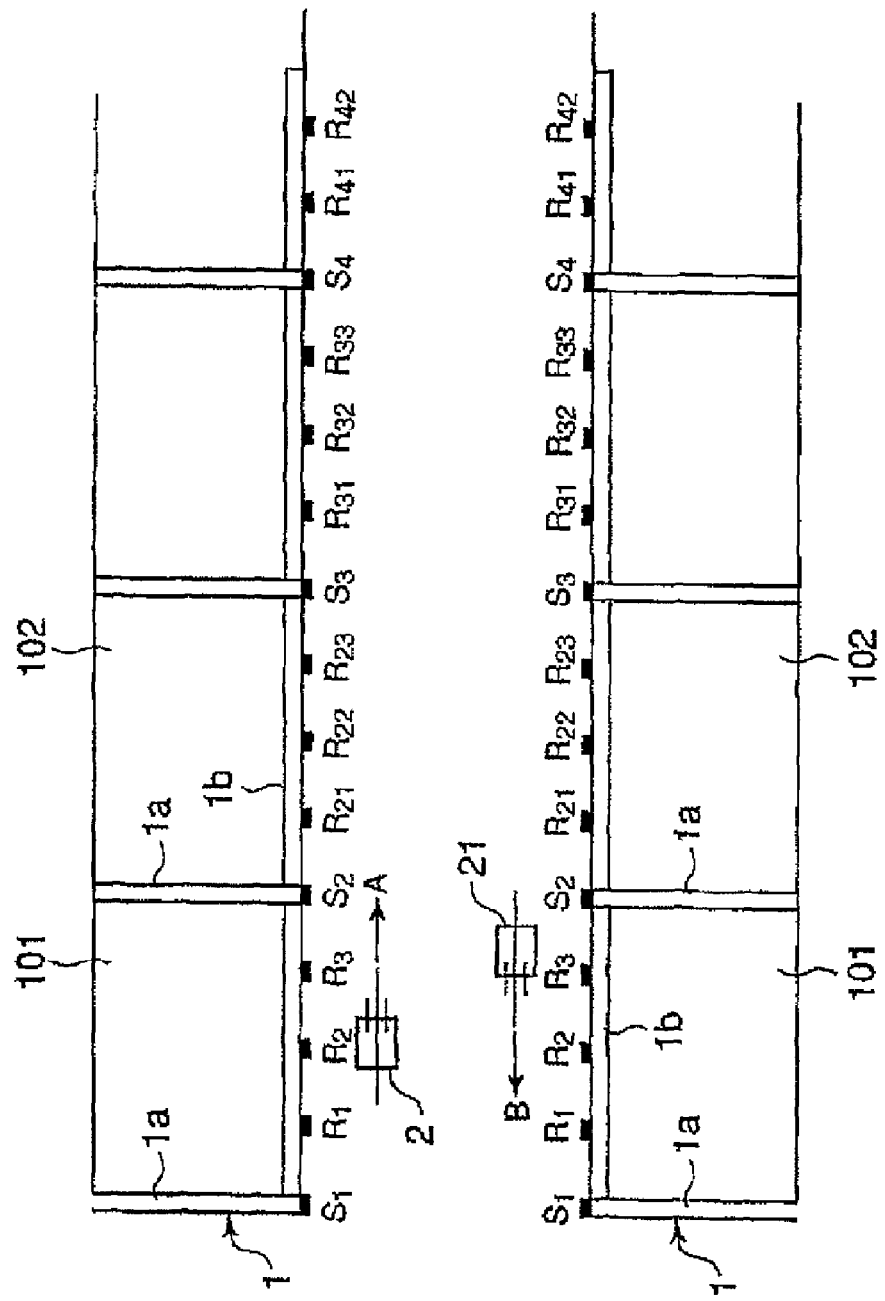
FIG. 1 is a schematic plan view of a forklift truck location system in a warehouse provided with a plurality of racks to which reflector plates adhered and which are installed so that forklift trucks can travel between them.
Figure 2:
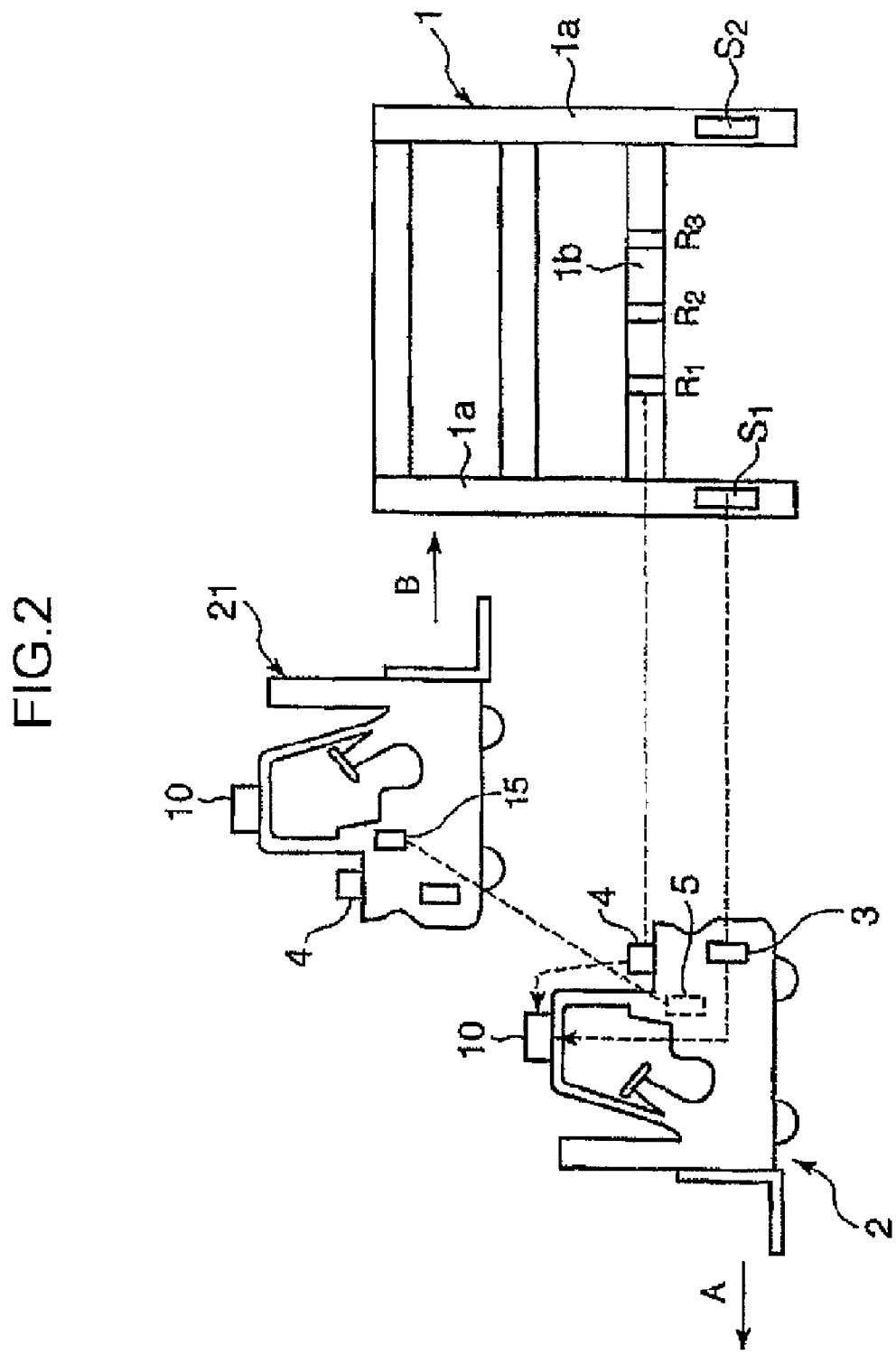
FIG. 2 is a schematic side elevation view of one of the rack sections and forklift trucks traveling in the right and left direction.

FIG. 1 is a schematic plan view of a forklift truck location system in a warehouse provided with a plurality of racks to which reflector plates adhered and which are installed so that forklift trucks can travel between them, and FIG. 2 is a schematic side elevation view of one of the racks and forklift trucks traveling in the right and left direction.

Referring FIGS. 1 and 2, reference numeral 1 is a rack composed of upright frame members 1a and lateral frame members 1b connecting to the upright frame members 1a to form a lattice-shaped rack. Reference numeral 2 and 21 are forklift trucks. The rack 1 has a plurality of lattice-shaped rack sections 101, 102, . . . and a plurality of racks (two racks 1 are shown in FIG. 1) are installed along travel directions of the forklift trucks. The forklift truck 2 traveling in direction A passes the forklift truck 21 traveling in direction B in a passageway between two racks.

First reflector plates S1, S2, S3, S4, . . . are attached respectively to each of the upright frame members 1a at a height position between adjacent lateral frame members or between the floor and the lowest lateral frame member (see FIG. 2) so that they face the passageway in front of each rack 1.

Second reflector plates R1, R2, R3, and R21, R22, R23, and R31, R32, R33, and R41, R42, . . . are attached to one of the lateral frame members 1b respectively of each rack sections 101, 102, . . . so that they face the passageway in front of each rack 1.

As the rack 1 is composed of a plurality of rack sections of the same size arranged in series in the embodiment, the first reflector plates S1, S2, S3, S4, . . . are located at equal spacing. The second reflector plates R1, R2, R3, . . . are also arranged in series at equal spacing.

As shown in FIG. 2, a first sensor 3 and a second sensor 4 are attached to the forklift truck 2 at a lower part and upper part of the body thereof respectively. The sensors are retro-reflective type sensors. The first sensor 3 emits a light beam toward the first reflector plates S1, S2, . . . and receives its reflection reflected from the reflector plates S1, S2, . . . . The second sensor 4 emits a light beam toward the second reflector plates R1, R2, . . . and receives reflection reflected from the reflector plates R1, R2, . . . .

As the forklift 2 travels, the light beam emitted from the first sensor 3 is reflected from the first reflector plates S1, S2, . . . and the reflection from them is received sequentially by the first sensor 3, and the light beam emitted from the second sensor 4 is reflected from the second reflector plates R1, R2, . . . and the reflection from them is received sequentially by the second sensor 4.

Figure 3:
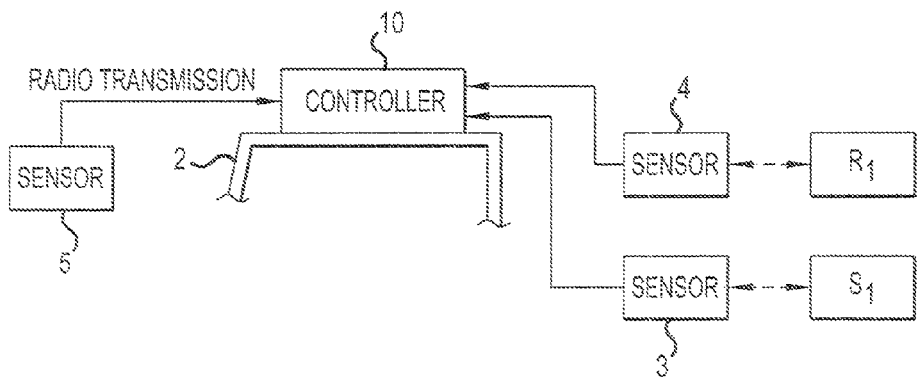
FIG. 3 is a control block diagram of the system for detecting the actual position of the forklift truck.

As shown in FIG. 3 showing a control block diagram of the system, the received signals are inputted to the controller 10 installed on top of the forklift 2 (it may be installed anywhere of the forklift truck 2). As to a third sensor 5 in FIG. 3 will be explained later.

Next, the method of detecting current position of the forklift truck 2 according to the embodiment of the invention will be explained referring to FIGS. 1 to 4.

Figure 4:
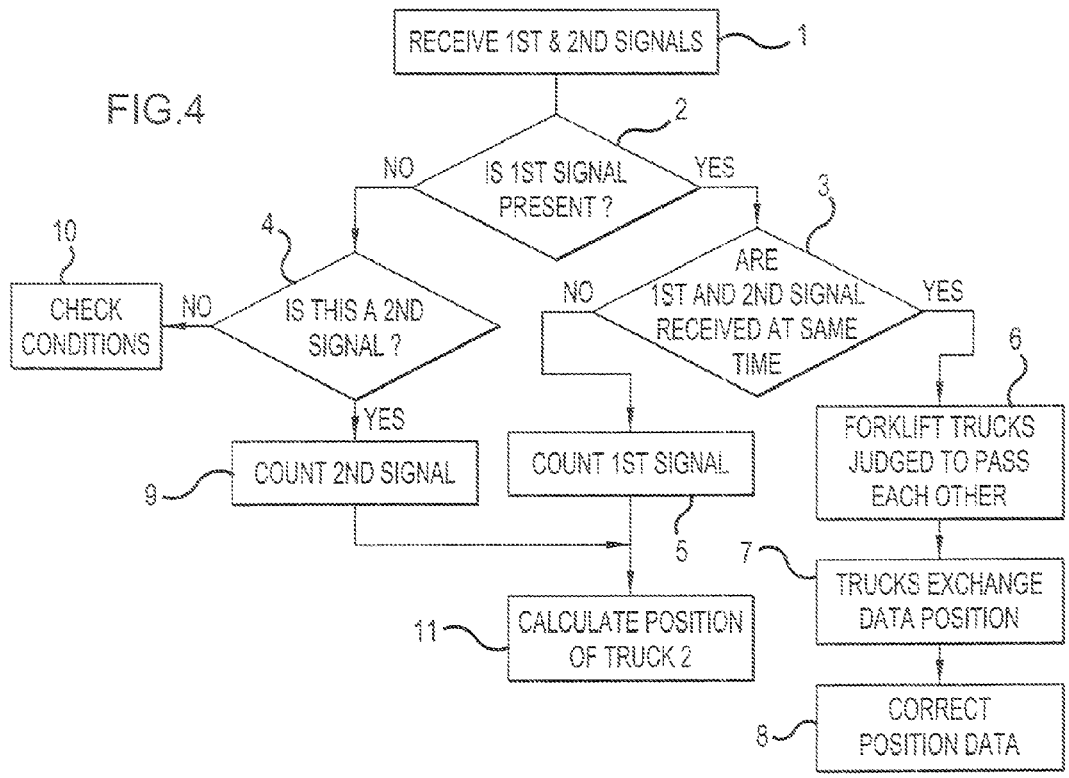
FIG. 4 is a control flowchart of the system for detecting the actual position of the forklift truck.

In FIG. 4 showing a control flowchart of the system, the first sensor 3 receives reflection (first signals) from the first reflector plates S1, S2, . . . and the second sensor 4 receives reflection (second signals) from the second reflector plates R1, R2, . . . at step (1). The signals are inputted to the controller 10. Whether an inputted signal is a first signal or not is judged by the controller 10 at step (2). When 'YES', whether a second signal is imputed at the same time with the first signal is judged at step (3). At the step (3), when 'NO', the first signal is counted by the controller 10, and when 'YES', i.e. the first and second signals are received at the same time, it is judged that two forklift trucks pass each other at step (6) and the position data of the forklift trucks 2 and 21 are sent and received via radio waves to and from one another at step (7). As to the reception of the first and second signals at the same time, it is explained later.

The position data of the forklift truck 2 is corrected using the position data of the forklift truck 21, and vice versa at step (8).

When 'NO' at the step (2), advanced to step (4) and whether the signal is a second signal or not is judged. When 'YES', the second signal is counted at step (9), and when 'NO', conditions of signals around the forklift truck 2 including the sensors, reflector plates, and controller is checked at step (10).

At step (11) is calculated the position of the forklift truck 2 based on the counted number of first and second signals.

Next, a means to obtain probability of correctness of the detected position of the forklift 2 according to the embodiment of the invention will be explained referring to FIGS. 1 to 4.

As shown in FIG. 1 for example, we consider a state the forklift truck 2 is traveling between the upright frame member 1a and 1a in direction A, the second sensor 4 approaching the second reflector plate R2, and the reflection from the reflector plate S1 has been received by the first sensor 3 and counted by the controller as a first signal. When the second sensor 4 comes nearest to the second reflector plate R2 and reflection from the second reflector plate R2 is actually received by the second sensor 4 when there existing no obstacle to interrupt the light beam emitted and its reflection between the forklift truck 2 and the rack 1, the reflection from the second reflection plate R2 is counted as a second signal by the controller 10.

When the forklift truck 2 is traveling after the reflection from the first reflector plate S1 is actually received by the first sensor 3 and counted by the controller 10, the reflection from the second reflector plate R2 received by the second sensor 4 is a secondarily counted second signal. However, when reflection from the R1 plate is not actually received by the second sensor 4 due to existence of any obstacle, the reflection from the reflector plate R2 is judged as reflection from the R1 plate, that is, as first counted second signal.

Concerning reflection reflected from the second reflector plates and received by the second sensor 4, probability Ra that the first received reflection is actually the reflection from the R1 plate, probability Rb that the secondly received reflection is actually the reflection from the R2 plate, probability Rc that the thirdly received reflection is actually the reflection from the R3 plate, and so forth, are calculated based on probability theory. With what degree of correctness the position of the forklift truck 2 is detected can be estimated probabilistically (for example, with probability of correctness of 50% or 80%, etc.).

Further, concerning reflection reflected from the first reflector plates and received by the first sensor 3, probability Sa that the first received reflection is actually the reflection from the S1 plate, probability Sb that the secondly received reflection is actually the reflection from the S2 plate, probability Sc that the thirdly received reflection is actually the reflection from the S3 plate, and so forth, are calculated based on probability theory. With what degree of correctness the position of the forklift truck 2 is detected can be estimated probabilistically using these probability values.

Like this, when the forklift truck 2 enters the passageway of the racks and advances passing by each of rack sections 101, 102, . . . , by counting reflections received by the first sensor 3 from the reflector plates S1, S2, . . . and reflections received by the second sensor 4 from the reflector plates R1, R2, . . . , actual position of the forklift 2 is determined based on the counted number of reflections actually received by the first and second sensors.

Thus, probability of correctness of the detected position is estimated using probability value of Ra, Rb, Rc, . . . , and Sa, Sb, Sc, . . . .

In addition to detecting the position of the forklift truck 2 by counting the number of received reflections starting from the entrance of the forklift truck 2 to the rack 1, also the position of the forklift truck 2 can be detected by the ratio of the number of reflections from the reflector plates R1, R2, ... actually received by the second sensor 4 after reflection from a first reflector plate is received by the first sensor to the total number of the reflector plates R1, R2, .... For example, when three second reflector plates R21, R22, and R23 are adhered to the lateral frame member 1b of the rack section 102, position of the forklift truck 2 can be detected by the ratio of number of reflections received by the second sensor 4 after reflection from the reflector plate S2 is received by the first sensor 3 is received to three which is the total number of reflector plates R21, R22, and R23.

As to at what section of the rack 1 the forklift truck 2 is present can be detected by the ratio of the number of reflections received actually by the first sensor 3 to the total number of the first reflector plates S1, S2, ....

Therefore, probabilistic accuracy of detection of the position of the forklift truck 2 decreases as it goes away from the entrance of the rack 1 both in the case of counting received reflection and the case of determining by said ratio. To compensate decrease in accuracy, correction is performed. This correction is done in two ways.

The first method of correction is as follows. When three second reflector plates are attached to the lateral frame member of one rack section, the counted number of reflections from the second reflector plate R1, R2, and R3 is corrected to three every time reflection from the first reflector plates S1, S2, ... are received, even when counted number for the first rack section 101 where R1, R2, and R3 are attached and that for the second rack section 102 where R21, R22, and R23 are attached and so forth is smaller than three or larger than three (which will occur when reflection from the first reflector plates is not received, i.e. skipped reading). That is, the number of reflections received by the second sensor 4 is corrected so that the number does not exceed three between reception of reflection from the first reflector plates by the first sensor 3.

The second method of correction is as follows. With this second method, the position data of the forklift truck 2 is corrected by the position data of the forklift truck 21 when the former passes the latter. For example, when the forklift truck 2 and 21 pass each other, position data of each of them coincide with each other, and probability of correctness of the forklift truck 2 is 85% and that of the forklift truck 21 is also 85%, highly accurate position data of near 100% probability of correctness can be obtained by calculating based on probability theory using both the data. When each of the position data is different from each other, also more accurate position data can be obtained by calculating based on probability theory using probabilities of both the data.

Accuracy of position data is increased by correcting as mentioned above.

As has been described above, according to the embodiment, (1) the controller 10 can determine the position of the forklift truck 2 from the number of reflections received by the first sensor 3 and that received by the second sensor 4, (2) the controller 10 can estimate the position of the forklift truck 2 from the ratio of the number of reflections from reflector plates R1, R2, ... actually received by the second sensor 4 to the number of a plurality of reflector plates R1, R2, ... attached to the lateral frame member 1b along the longitudinal direction thereof after reflection from one of the first reflector member is received by the first sensor 3, and (3) the controller 10 can estimate the position of the forklift truck 2 from the number of reflections from reflector plate S1, S2, ... actually received by the first sensor 3 and the number of reflections from reflector plates R1, R2, ... actually received by the second sensor 4.

As the position of the forklift 2 is determined from the number of reflections from the first reflector plates S actually received by the first sensor 3 and the number of reflections from the second reflector plates R actually received by the second sensor 4 together with its correctness probability, so probabilistic correctness of the determination of the position can be grasped. Further, accuracy of the position data can be increased by correcting the data.

Thus, current position of the forklift truck 2 can be detected with increased reliability even if some of the reflections fail to be received by the sensors.

Detection of the position of the forklift truck 2 when it passes the forklift truck 21 traveling in counter direction as shown in FIG. 1 is performed as follows.

Each of the forklift trucks 2 and 21 has a third sensor 5 and reflector 15 respectively attached to a side of the body thereof at the same height position so that the third sensor 5 faces the reflector 15 when the forklift trucks pass each other.

When they pass each other, emission, reflection, and reception of a signal is done between the third sensor 5 and reflector 15, and the reception is inputted to the controller 10, with which the controller recognizes the passing each other. It is preferable to provide the third sensor and reflector to both sides of the forklift truck so that passing each other can be detected when forklift trucks are traveling in the same or counter direction.

Although the detection of passing each other by the third sensor 5 and reflector 15 is not written in the flowchart of FIG. 4, it is possible to proceed to step (6) in the flowchart by recognizing passing each other in this way.

Figure 5:
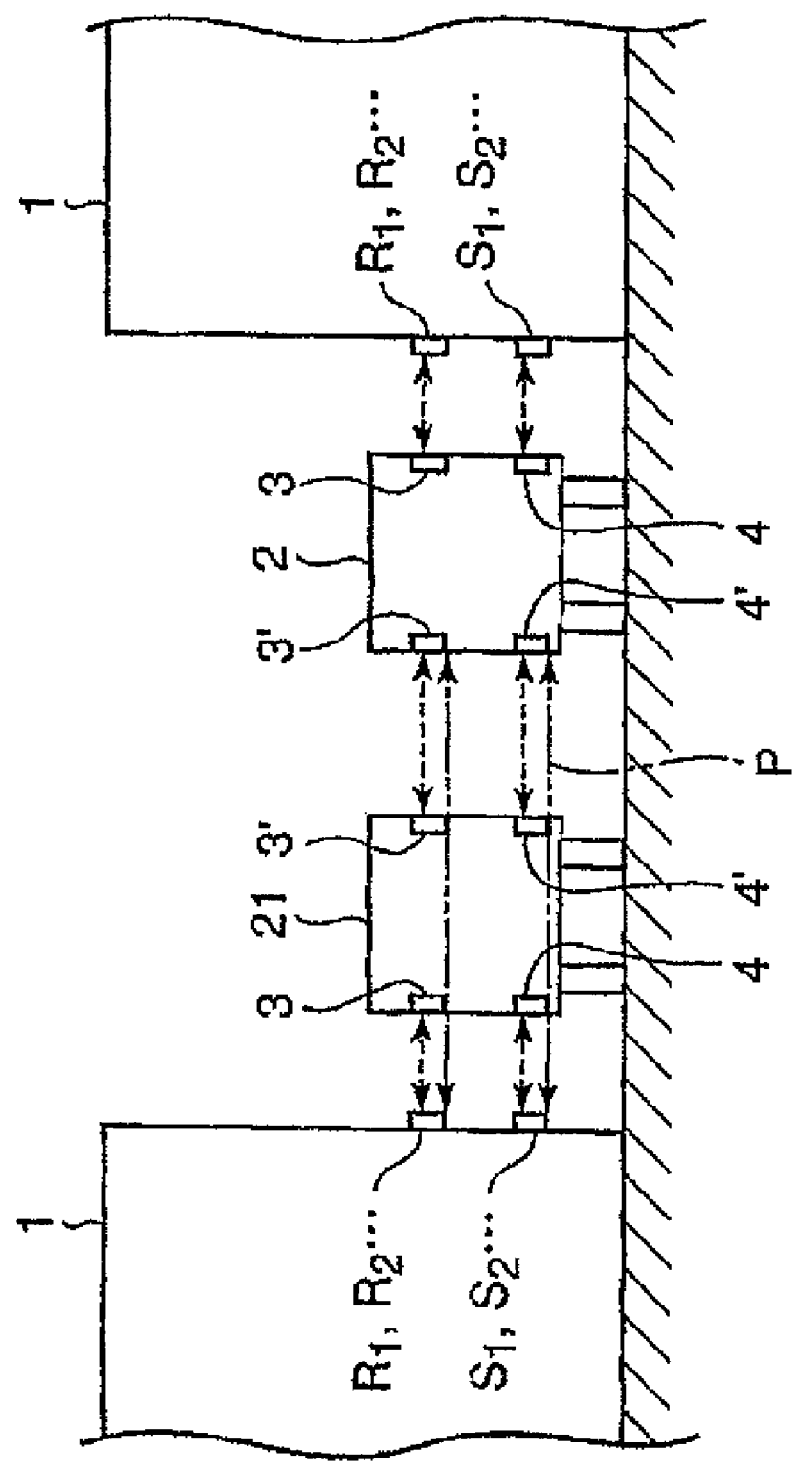
FIG. 5 is a schematic front view showing a state two forklift trucks pass each other

As another method of detecting passing each other, it is suitable that first sensors 3, 3' and second sensors 4, 4' are attached to both sides of the forklift truck as shown in FIG. 5 whereby each of the sensors has a reflector. In FIG. two forklift trucks are traveling in counter direction. When two forklift trucks pass each other, the first sensor 3' and second sensor 4' of one of the forklift truck receives reflection from the reflector of the first sensor 3' and second sensor 4' respectively of the other forklift truck, and vice versa. When two forklift trucks are traveling in the same direction and they pass each other, the first sensor 3' and second sensor 4' of one of the forklift truck receives reflection from the reflector of the first sensor 3 and second sensor 4 respectively of the other forklift truck, and vice versa.

As the first sensor 3 and the second sensor 4 do not receive reflection from the first reflector plates S1, S2, ... and the second reflector plates R1, R2, ... respectively at the same time, when reflection is received by the first and second sensors at the same time, it is recognized by the controller 10 that two forklift trucks pass each other.

By attaching first and second sensors each having a reflector to both sides of the forklift truck as shown in FIG. 5, the third sensors and reflectors for detecting passing each other of two forklift trucks are not needed to be provided to the forklift truck, and the system can be simplified, and further, passing each other of two forklift trucks can be detected in both cases they pass each other when traveling in the same direction and counter direction.

Further, when there is no other forklift tuck passing the concerned truck, first reflector plates S1, S2, ... and second reflector plates R1, R2, ... attached to the rack of opposite, i.e. the rack located at remoter side from the concerned forklift truck can be detected by the sensors attached to the other side of the forklift truck as shown by chain-lined arrow P too, accuracy of detection of position of the concerned forklift truck can be increased.

When passing each other of two forklift trucks 2 and 21 is detected, the position data in the controller 10 of each of the forklift trucks 2 and 21 is transmitted with wireless communication to each other, and accuracy of position detection of the concerned forklift truck 2 can be increased by correcting using the position data of the other forklift truck 21.

According to the invention, a system for detecting actual position of a material handling vehicle in a warehouse in which a plurality of racks composed of upright frame members and lateral frame members connecting the upright members are installed so that material handling vehicles can travel along the passageway between the racks, can be detected together with correctness probability of the detected position, so that current position of the material handling vehicle in a warehouse can be detected with increased reliability even if some of the reflections fail to be received by the sensors. Further, the result of detection of position of the material handling vehicle is checked and corrected by several ways, so the position is detected with high accuracy. Therefore, it becomes possible to increase accuracy in management of material handling in the warehouse, that is, taking out and putting in material from and to specified places in the rack can be performed accurately.

The invention claimed is:

1. A material handling vehicle location system in a warehouse in which a plurality of racks composed of upright frame members and lateral frame members connecting the upright members are installed so that a material handling vehicle can travel along a passageway between the racks; wherein a first reflector plate is attached to each of the upright frame members at a height position between adjacent lateral frame members or between the floor and is lowest lateral frame member so that the first reflector plates attached to the upright frame member face the passageway, and a plurality of second reflector plates are attached to the lateral frame member along longitudinal direction thereof; wherein a first sensor which emits a light beam and receives its reflection from each of the first reflector plates and a second sensor which emits a light beam and receives its reflection from each of the second reflector plates are attached to the vehicle; and wherein is controller which determine current location of the vehicle based on combination of the number of reflections actually received by the first sensor and counted by the controller and the number of reflections actually received by the second sensor and counted by the controller is installed on the vehicle.

2. A material handling vehicle location system according to claim 1, wherein said first and second reflector plates are located at equal spacing respectively, and said controller determines the current location of the material handling vehicle from a ratio of the number of reflections actually received by the first sensor and counted by the controller to total number of the first reflector plates and a ratio of the number of reflections actually received by the second sensor and counted by the controller to total number of the second reflector plates.

3. A material handling vehicle location system according to claim 1, wherein said controller calculates a probability that the material handling vehicle is present in front of a reflector plate corresponding to the counted number of reflections actually received by the first and second sensors.

\* \* \* \* \*